US010649701B2

(12) United States Patent
Shigetomi (10) Patent No.: US 10,649,701 B2
(45) Date of Patent: May 12, 2020

(54) IMAGE PROCESSING SYSTEM (71) Applicant: KYOCERA Document Solutions Inc., Osaka (JP)

(72) Inventor: Masayuki Shigetomi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/227,457

(22) Filed: Dec. 20, 2018

(65) Prior Publication Data

US 2019/0196757 A1 Jun. 27, 2019

(30) Foreign Application Priority Data

Dec. 26, 2017 (JP) .................................. 2017-250227

(51) Int. Cl.
*G06F 3/12* (2006.01)

(52) U.S. Cl.
CPC .......... *G06F 3/1226* (2013.01); *G06F 3/1204* (2013.01); *G06F 3/1232* (2013.01); *G06F 3/1253* (2013.01); *G06F 3/1261* (2013.01); *G06F 3/1292* (2013.01); *G06F 3/1294* (2013.01); *G06F 3/1236* (2013.01)

(58) Field of Classification Search
CPC .................................................. G06F 3/1292
See application file for complete search history.

(56) References Cited

U.S. PATENT DOCUMENTS

| 6,728,632 | B2 * | 4/2004 | Medl | G01C 21/00 701/500 |
| 6,822,754 | B1 * | 11/2004 | Shiohara | G06F 3/1211 358/1.13 |
| 8,559,033 | B2 * | 10/2013 | Kohli | G06F 3/1261 358/1.14 |
| 8,786,875 | B1 * | 7/2014 | Khafizova | G06F 3/1204 358/1.15 |
| 8,982,389 | B2 * | 3/2015 | Sasaki | H04N 1/0035 358/1.14 |
| 2003/0142016 | A1 * | 7/2003 | Pickup | G01S 1/047 342/387 |
| 2005/0192683 | A1 * | 9/2005 | Narayanan | G06F 3/0346 700/61 |
| 2008/0124093 | A1 * | 5/2008 | Kai | G03G 15/5087 399/9 |

(Continued)

FOREIGN PATENT DOCUMENTS

| JP | 2016-057829 A | 4/2016 |
| JP | 2016-057995 A | 4/2016 |
| JP | 2016057829 A * | 4/2016 |

*Primary Examiner* — Ted W Barnes
(74) *Attorney, Agent, or Firm* — IP Business Solutions, LLC (57) ABSTRACT In an image processing system, a mobile terminal device obtains a position and a direction of each image forming apparatus relative to the mobile terminal device on a basis of respective wireless signals transmitted from each of the image forming apparatuses and is received by a near field communication unit, and displays on a display unit the position and the direction. When an arbitrary image forming apparatus is selected by operation of a touch panel, image data to be printed is transmitted via a network by a network communication section to the selected image forming apparatus.

7 Claims, 8 Drawing Sheets

(56) References Cited

U.S. PATENT DOCUMENTS

| | | | |
|---|---|---|---|
| 2009/0122340 A1* | 5/2009 | Nagahama | G06F 3/1207 358/1.15 |
| 2009/0249372 A1* | 10/2009 | Park | G06F 3/1204 719/330 |
| 2011/0149342 A1* | 6/2011 | Tsujii | G06F 3/1206 358/1.15 |
| 2014/0063542 A1* | 3/2014 | Aoki | G06F 3/1296 358/1.15 |
| 2014/0085663 A1* | 3/2014 | Kavanappillil | H04N 1/00342 358/1.15 |
| 2014/0176991 A1* | 6/2014 | Yun | H04W 76/14 358/1.15 |
| 2014/0253965 A1* | 9/2014 | Asai | G06F 3/1205 358/1.15 |
| 2015/0126115 A1* | 5/2015 | Yun | H04L 63/0492 455/41.1 |
| 2016/0007778 A1 | 3/2016 | Balinsky et al. | |
| 2016/0077778 A1* | 3/2016 | Aritomi | G06F 21/35 358/1.15 |
| 2016/0292553 A1* | 10/2016 | Nagasawa | G06K 15/4095 |
| 2017/0257496 A1* | 9/2017 | Nagasaki | G06F 3/1203 |
| 2017/0310849 A1* | 10/2017 | Hosoda | G06F 3/1203 |
| 2018/0152589 A1* | 5/2018 | Matsuda | H04N 1/32112 |
| 2019/0018621 A1* | 1/2019 | Akahira | G06F 3/1204 |

\* cited by examiner

IMAGE PROCESSING SYSTEM

INCORPORATION BY REFERENCE

This application claims priority to Japanese Patent Application No. 2017-250227 filed on Dec. 26, 2017, the entire contents of which are incorporated by reference herein.

BACKGROUND

The present disclosure relates to an image processing system in which a plurality of image forming apparatuses is connected to a mobile terminal device via a network, and to a mobile terminal device applied to the image processing system. In particular, the present disclosure relates to a technique for selecting an arbitrary image forming apparatus at the mobile terminal apparatus side and using the selected image forming apparatus.

As for examples of image processing systems, there are a first image processing system and a second image processing system. In the first image processing system, respective identification signals are transmitted to a mobile terminal from each individual information transmitting devices, and the identification signals are transmitted from the mobile terminal to a server computer. The server computer determines positional relationships among the mobile terminal and the printers on a basis of each of the identification signals. In accordance with variation in the positional relationships, the printers are instructed to either transmit/receive print data specified by a user, or execute printing, or prepare the printer. In addition, the server computer switches among the printers as the mobile terminal moves, and also guides the mobile terminal to the printer.

In the second image processing system, distance between a mobile terminal and a printer is measured using wireless communication. When the distance becomes short and reaches a predetermined distance, the printer is selected and print data is transmitted to the printer; when the distance becomes shorter, printing by the printer is put on hold; and when the distance becomes further shorter, the printing is executed by the printer. Furthermore, in the second image processing system, a user can select any of a plurality of printers by operating the mobile terminal.

SUMMARY

A technique improved over the above techniques is proposed herein as one aspect of the present disclosure.

An image processing system according to one aspect of the present disclosure includes a plurality of image forming apparatuses and a mobile terminal device connected to each of the image forming apparatuses via a network. Each of the image forming apparatuses includes a first network communication unit, a first near field communication unit, an image forming unit, and a first controller. The first network communication unit performs data communication with the mobile terminal device via the network. The first near field communication unit performs near field communication with the mobile terminal device. The image forming unit forms an image on a recording sheet. The first controller causes the image forming unit to form, on the recording sheet, an image shown by image data transmitted from the mobile terminal device and been received by the first network communication unit. The mobile terminal device includes a display unit, an operation unit, a second network communication unit, a second near field communication unit, and a second controller. The operation unit accepts input of an instruction from a user. The second network communication unit performs data communication with each of the image forming apparatuses via the network. The second near field communication unit performs near field communication with the first near field communication unit of each of the image forming apparatuses. When the second near field communication unit receives respective wireless signals transmitted from each of the image forming apparatuses, the second controller detects a position and a direction of each of the image forming apparatuses relative to the mobile terminal device on a basis of each of the wireless signals and causes the display unit to display the positions and the directions, and when the operation unit accepts an instruction to select a first one of the image forming apparatuses, the second controller causes the second network communication unit to transmit image data to be printed and a print execution request to the first one of the image forming apparatuses selected by the instruction.

A mobile terminal device according to another aspect of the present disclosure includes a display unit, an operation unit, a second network communication unit, a second near field communication unit, and a second controller. The operation unit accepts input of an instruction from the user. The second network communication unit performs data communication with each image forming apparatus to which the mobile terminal device is connected via a network. The second near field communication unit performs near field communication with each of the image forming apparatuses. When the second near field communication unit receives respective wireless signals transmitted from each of the image forming apparatuses, the second controller detects a position and a direction of each of the image forming apparatuses relative to the mobile terminal device on a basis of each of the wireless signals and causes the display unit to display the positions and the directions, and when the operation unit accepts an instruction to select a first one of the image forming apparatuses, the second controller causes the second network communication unit to transmit image data to be printed and a print execution request to the first one of the image forming apparatuses selected by the instruction.

DETAILED DESCRIPTION

Figure 1:
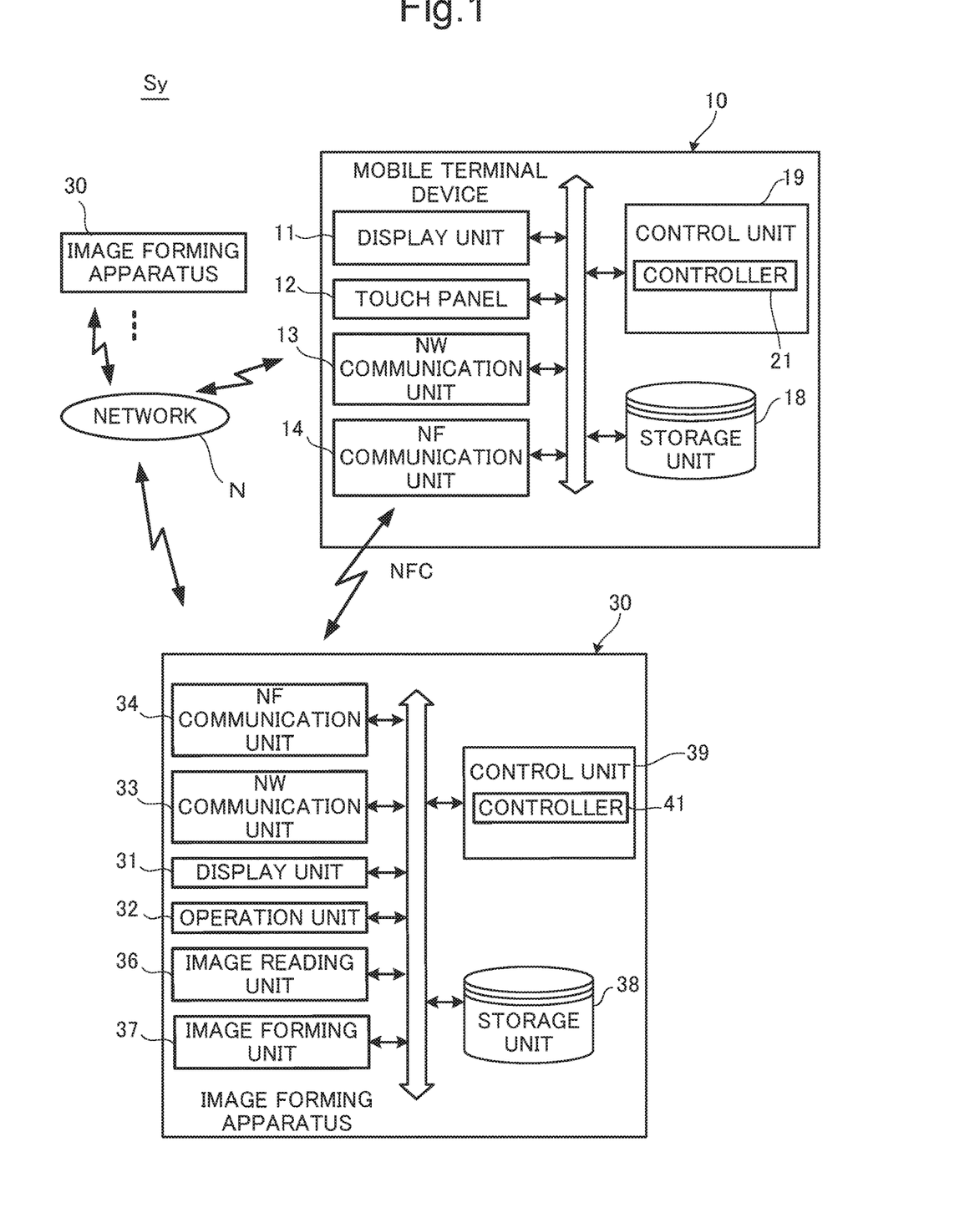
FIG. 1 is a block diagram showing an image processing system according to an embodiment of the present disclosure.

Hereinafter, a description will be given of an image processing system according to one embodiment of the present disclosure with reference to the drawings. FIG. 1 is a block diagram showing the image processing system Sy according to the one embodiment of the present disclosure. The image processing system Sy of the present embodiment includes a mobile terminal device 10 and a plurality of image forming apparatuses 30 connected to the mobile terminal device 10 via a network N. In the image processing system Sy, the mobile terminal device 10 is, for example, a smartphone and a mobile device. The mobile terminal device 10 includes a display unit 11, a touch panel 12, a network (NW) communication unit 13, a near field (NF) communication unit 14, a storage unit 18, and a control unit 19. Each of these constituent elements is capable of transmitting and receiving data and signals to and from each other via a bus. As described later on, the control unit 19 includes a control unit 21. The touch panel 12 is one example of the operation unit in What is claimed is. In addition, the network communication unit 13 and the near field communication unit 14 respectively correspond to the second network communication unit and the second near field communication unit in What is claimed is, and further, a controller 21 corresponds to the second controller in What is claimed is.

The display unit 11 is formed of a liquid crystal display (LCD), an organic light-emitting diode (OLED), and the like.

The touch panel 12 is a touch panel of, for example, a so-called resistive film type or electrostatic capacitance type. The touch panel 12 is disposed on a display screen of the display unit 11, and detects touch of a finger or the like on a soft key arranged on the display screen of the display unit 11, together with its touched position. Upon detecting touch of a finger or the like, the touch panel 12 outputs a detection signal indicating the coordinates of the touched position to the control unit 19. Thus, the touch panel 12 performs a role as an operation unit where user operation performed on the display screen of the display unit 11 is inputted to.

The network communication unit 13 is a communication interface having a communication function such as a LAN chip (not shown). The network communication unit 13 is connected to each of the image forming apparatuses 30 via the network N, and exchanges data with each of the image forming apparatuses 30.

The near field communication unit 14 is a communication device that performs wireless communication based on near field communication, for example Bluetooth (registered trademark) low energy.

The storage unit 18 is a large-capacity storage device such as a random access memory (RAM), a hard disk drive (HDD), and the like, and stores various application programs, various kinds of information, and the like.

The control unit 19 includes, for example, a processor, a random access memory (RAM), and a read only memory (ROM). The processor is a central processing unit (CPU), an MPU, an ASIC, and the like. The control unit 19 functions as the controller 21 when a control program stored in the ROM or the storage unit 18 is executed by the processor.

The controller 21 governs overall operation control of the mobile terminal device 10. The controller 21 is connected to the display unit 11, the touch panel 12, the network communication unit 13, the near field communication unit 14, and the storage unit 18, and performs the operation control of these components and signal and data exchange with the individual components.

In addition, the controller 21 performs a role as a processing unit that executes, for example, processing in accordance with the operation of the touch panel 12. Further, the controller 21 has a function of controlling communication operation of the network communication unit 13 and the near field communication unit 14. The controller 21 has a function of controlling display operation of the display unit 11.

Descriptions will be given to each of the image forming apparatuses 30 included in the image processing system Sy. The image forming apparatuses 30 are each configured similarly. Each of the image forming apparatuses 30 includes a display unit 31, an operation unit 32, a network communication unit 33, a near field (NF) communication unit 34, an image reading unit 36, an image forming unit 37, a storage unit 38, and a control unit 39. Each of these constituent elements is capable of transmitting and receiving data and signals to and from each other via a bus. The network communication unit 33 and the near field communication unit 34 respectively correspond to the first network communication unit and the first near field communication unit in What is claimed is. In addition, a controller 41 corresponds to the first controller in What is claimed is.

The control unit 39 includes, for example, a processor, a RAM, and a ROM. The processor is a CPU, an MPU, an ASIC and the like. The control unit 39 functions as the controller 41 when a control program stored in the ROM or the storage unit 38 is executed by the processor.

The controller 41 integrally controls the image forming apparatus 30. The controller 41 performs a role as a processing unit that executes, for example, various kinds of processing necessary for the image formation by the image forming apparatus 30.

The display unit 31 is, for example, a liquid crystal display (LCD). The display unit 31 displays, for example, an operation screen required for the image forming process and a screen displaying an image indicating image forming apparatuses existing in the periphery.

The network communication unit (the NW communication unit in FIG. 1) 33 is a communication interface having a communication function such as a LAN chip (not shown), is controlled by the controller 41, and transmits and receives various kinds of data with the mobile terminal device 10 via the network N.

The near field communication unit 34 is controlled by the controller 41 and is a communication device that performs wireless communication based on near field communication, for example Bluetooth (registered trademark) low energy.

The image reading unit 36 has a scanner that optically reads a document placed on a contact glass, reads the document, and generates image data representing the image of the document.

The image forming unit 37 includes a photosensitive drum, a charging device that uniformly charges a surface of the photosensitive drum, an exposing device that exposes the surface of the photosensitive drum to form an electrostatic latent image on the surface of the photosensitive drum, a developing device that develops the electrostatic latent image on the surface of the photosensitive drum into a toner image, and a transfer device that transfers the toner image (image) on the surface of the photosensitive drum to a recording sheet (a recording medium). The image forming unit 37 prints an image shown by the image data received from the mobile terminal device 10 or the like or an image shown by the image data generated by the image reading unit 36 on the recording sheet.

Here, in the image processing system Sy according to the present embodiment, the near field communication unit 34 of each of the image forming apparatuses 30 has a function of executing, for example, an iBeacon (registered trademark), and periodically transmits an identification signal (an example of a wireless signal) indicating itself to the mobile terminal device 10.

For each of the image forming apparatuses 30, the near field communication unit 14 of the mobile terminal device 10 receives the identification signal transmitted from the near field communication unit 34 of the image forming apparatus 30 and transmits the identification signal to the controller 21.

Upon receiving the identification signal, the controller 21 detects the reception level of the identification signal received, determines the identification signal and the reception level thereof, and determines which of the image forming apparatuses 30 has transmitted the identification signal on the basis of the identification signal. In addition, the controller 21 detects a separation distance from the mobile terminal device 10 to the image forming apparatus 30 that has transmitted the identification signal, on the basis of the reception level of the identification signal.

Figure 2:
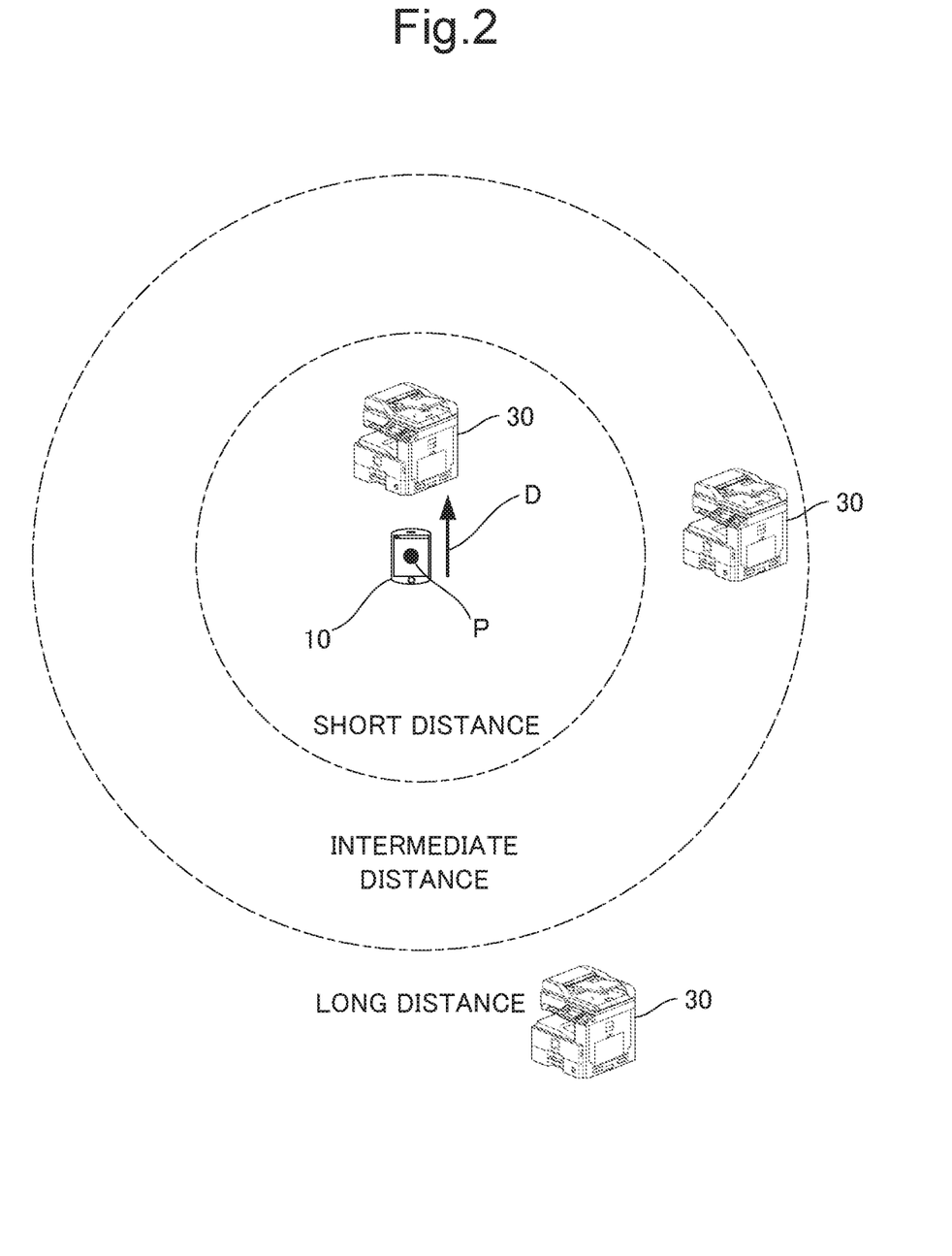
FIG. 2 is a diagram schematically showing relationships of a separation distance from a mobile terminal device to each image forming apparatus, and of a position and a direction of each of the image forming apparatuses relative to the mobile terminal device in the image processing system according to the embodiment.

Upon detecting each individual separation distances between the mobile terminal device 10 to each image forming apparatus 30, the controller 21 detects the positions of the image forming apparatuses 30 relative to the mobile terminal device 10 on the basis of the separation distances. For example, as shown in FIG. 2, the controller 21 determines for each of the image forming apparatuses 30 whether the corresponding separation distance from the mobile terminal device 10 is a short distance, an intermediate distance, or a long distance. For example, if the detected separation distance is within a predetermined range (for example, 5 m), the controller 21 determines that the distance is the short distance, and if the detected separation distance exceeds the predetermined range but is within a second predetermined range (for example, 10 m), the controller 21 determines that the distance is the intermediate distance, and if the detected separation distance indicates long distance exceeding the second predetermined range, the controller 21 determines that the distance is the long distance. Based on the detected distances (short, intermediate, or long distance), the controller 21 detects the respective positions of each of the image forming apparatuses 30. Instead of the above, the controller 21 may be configured to calculate each individual position of each of the image forming apparatuses 30 relative to the mobile terminal device 10 on the basis of positional information with respect to the mobile terminal device 10 to be transmitted from each of the image forming apparatuses 30 and of positional information of the mobile terminal device 10 to be acquired by a GPS function built in the mobile terminal device 10.

Further, the controller 21 obtains a direction D, which represents a heading direction of the mobile terminal device 10, relative to the image forming apparatuses 30. For example, since the electric waves of the identification signals that the mobile terminal device 10 receives change depending on whether the mobile terminal device 10 is approaching to or moving away from the near field communication unit (a transmitter of iBeacon (registered trademark)) 34 of each of the image forming apparatuses 30 (the change is, for example, that the radio becomes strong in approaching, and the radio becomes weak in leaving away), the controller 21 calculates the direction D of the mobile terminal device 10 relative to the image forming apparatuses 30 on the basis of changes in electric waves of the identification signals each transmitted from the respective image forming apparatuses 30.

Moreover, based on the respective identification signals transmitted from each of the image forming apparatuses 30, the direction D of the mobile terminal device 10 relative to the image forming apparatuses 30 may be obtained by using well-known other methods or by combining plural well-known methods.

Furthermore, an un-illustrated direction sensor may be arranged in the mobile terminal device 10 so that the controller 21 detects the direction D of the mobile terminal device 10 also on the basis of a signal outputted from the direction sensor: in such way, accuracy of detecting the direction D of the mobile terminal device 10 relative to the image forming apparatuses 30 may be improved.

When the controller 21 calculates the positions of the image forming apparatuses 30 and the direction D of the mobile terminal device 10, and acquires the positional information of the mobile terminal device 10 from the GPS function built in the mobile terminal device 10, the controller 21 causes the display unit 11 to display the positions of the image forming apparatuses 30, the direction D, and a position P of the mobile terminal device 10.

Figure 3:
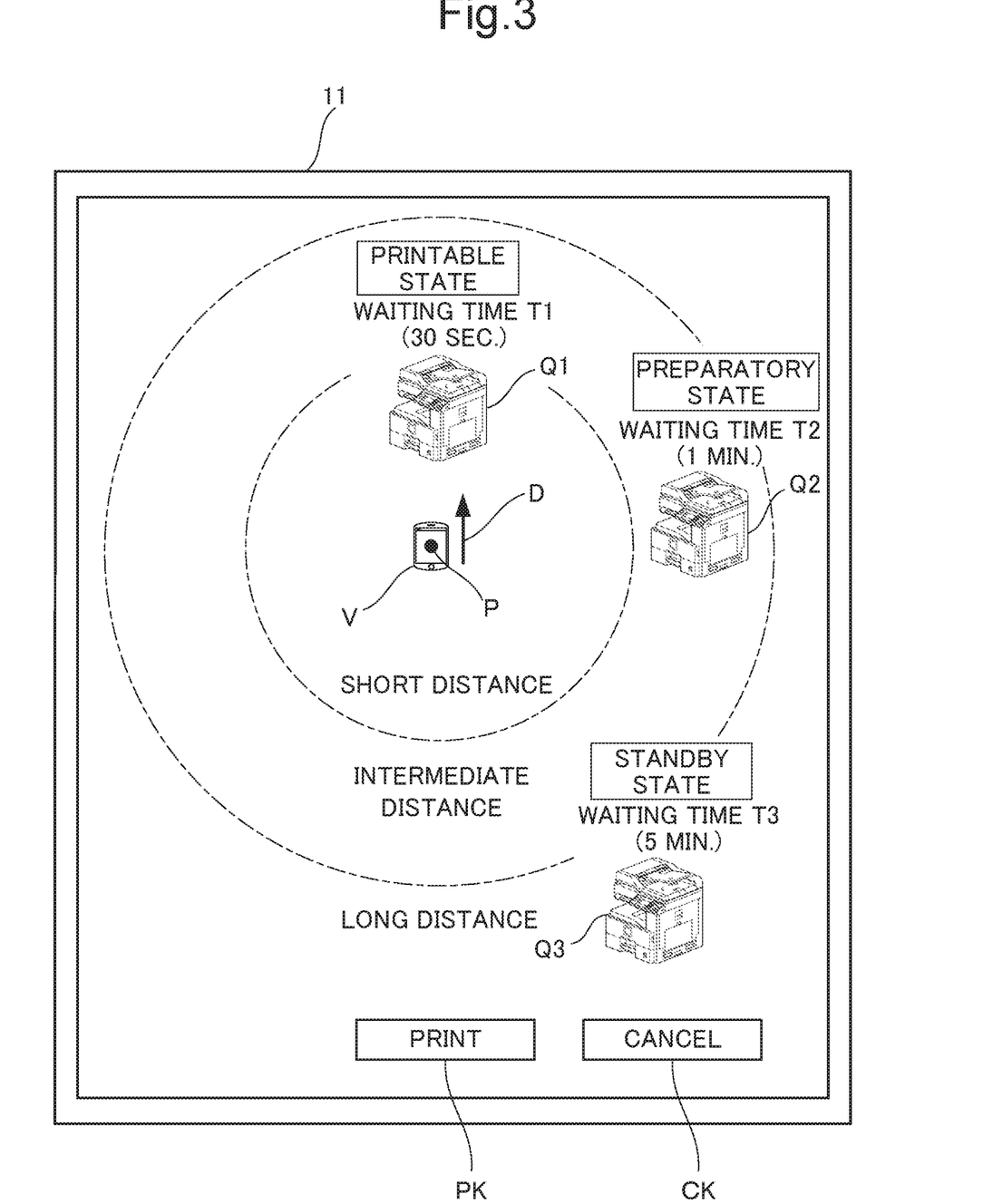
FIG. 3 is a diagram showing an example of the position and the direction of each of the image forming apparatuses relative to the mobile terminal device the mobile terminal device relative to each of the image forming apparatuses displayed on a display unit of the mobile terminal device.

FIG. 3 exemplifies the positions of the image forming apparatuses 30 relative to the mobile terminal device 10, and the direction D representing the heading direction of the mobile terminal device 10, all of which are displayed on the display unit 11. As shown in FIG. 3, at the display screen of the display unit 11, in accordance with the positions of the image forming apparatuses 30, the direction D, and the position P of the mobile terminal device 10, the controller 21 causes the display unit 11 to display, on the screen thereof, images Q1, Q2, and Q3 respectively representing each of the image forming apparatuses 30, and an image V representing the mobile terminal device 10. From the displayed image V of the mobile terminal device 10 relative to the images Q1, Q2, and Q3 of the image forming apparatuses 30, the user can grasp the respective positions of the image forming apparatuses 30 and the mobile terminal device 10.

Also, since the controller 21 shows the direction D of the mobile terminal device 10 as the image, the user is capable of knowing to which one of the image forming apparatuses 30 the mobile terminal device 10 is approaching by seeing the display screen of the display unit 11. The controller 21 causes the display unit 11 to display, on the display screen thereof, a print key PK, a cancel key CK, and the like in addition to the images Q1, Q2, and Q3 of the image forming apparatuses 30 and the image V of the mobile terminal device 10.

In the image processing system Sy configured as described above, on the display unit 11 of the mobile terminal device 10, the positions of the respective image forming apparatuses 30 are displayed by the images Q1, Q2, and Q3, the position P of the mobile terminal device 10 is displayed by the image V, and further, the direction D is displayed. When, in this state, the user of the mobile terminal device 10 operates the touch panel 12 to select an arbitrary one of the image forming apparatuses 30 and inputs a print execution instruction, the controller 21 accepts the selection. The controller 21 transmits the image data to be printed and a print execution request to the selected image forming apparatus 30 via the network communication unit 13. The image forming apparatus 30 that received the image data performs image formation by using the image data.

Figure 4A:
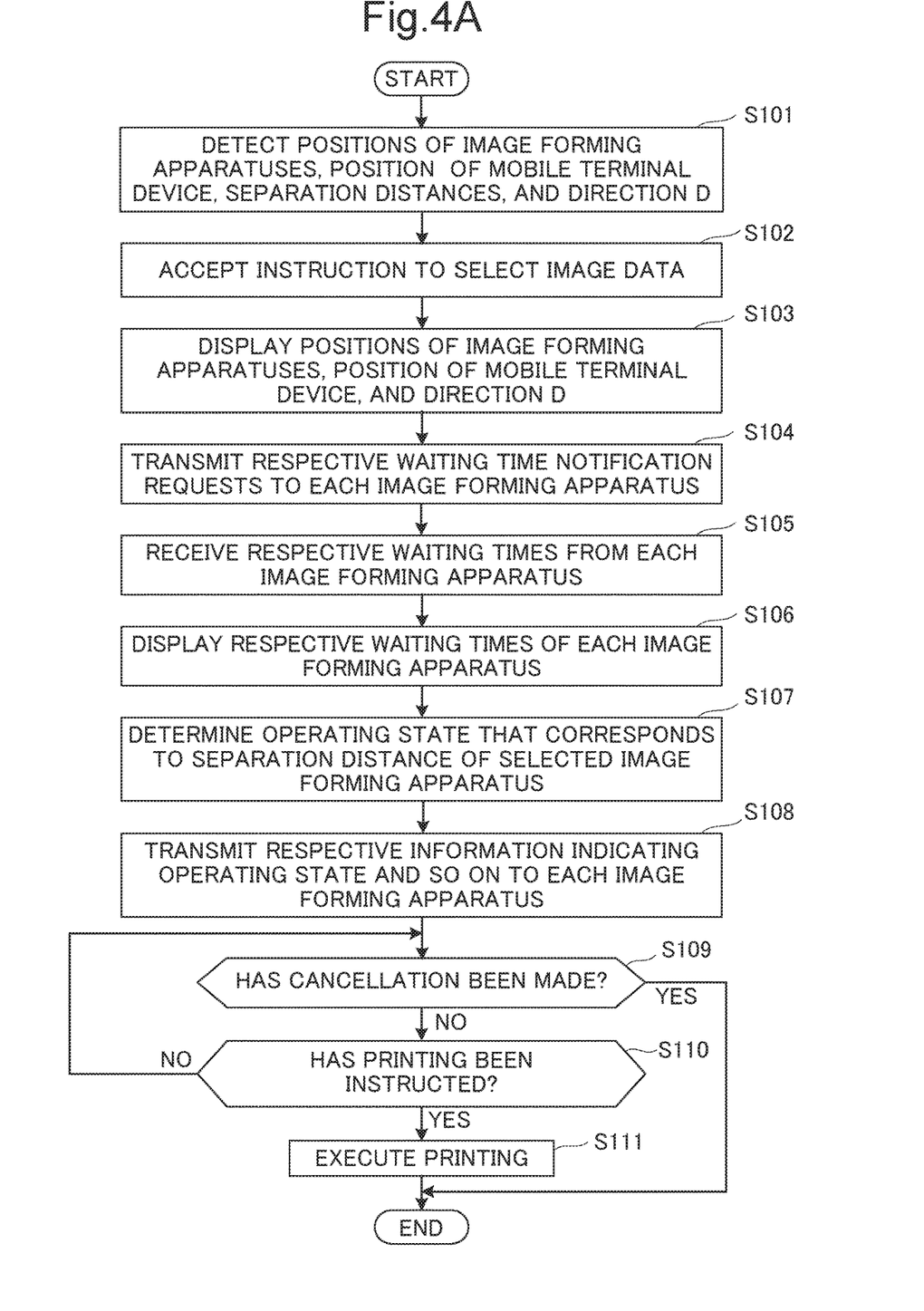
FIG. 4A is a flowchart showing processing procedures such as displaying of the position and a direction of the position and the direction of each of the image forming apparatuses relative to the mobile terminal device, the selecting of an arbitrary image forming apparatus, and transmission of image data to the selected image forming apparatus.

Next, transition processing of the image data performed by the mobile terminal device 10 toward the image forming apparatuses 30 will be described with reference to the flowcharts shown in FIGS. 4A and 4B.

In the mobile terminal device 10, the identification signal being transmitted at predetermined intervals (for example, 5 seconds) from the near field communication unit 34 of each of the image forming apparatuses 30 is received at the near field communication unit 14 and transmitted to the controller 21. Upon receiving the identification signals, the controller 21 detects the reception levels of the identification signals. The control section 21 identifies each of the image forming apparatuses 30 on the basis of each identification signal transmitted from each of the image forming apparatuses 30 and, based on the reception levels of the respective identification signals, calculates the separation distance between the mobile terminal device 10 to the respective image forming apparatuses 30. The controller 21 further detects: the positions of the image forming apparatuses 30; the position P of the mobile terminal device 10; and the above-described direction D of the mobile terminal device 10. Such detection processing is constantly performed at the mobile terminal device 10 (S101).

When the touch panel 12 accepts a print start instruction in response to user's operation on the touch panel 12, the print start instruction is transmitted to the controller 21 from the touch panel 12. Upon receiving the print start instruction, the controller 21 causes the display unit 11 to display, on the display screen thereof, a list of the image data to be printed stored, the list being stored in the storage unit 18. When, in this state, the user touches an image portion showing the desired image data displayed on the display screen of the display unit 11, the touch panel 12 accepts the instruction to select the image data displayed on the touched portion (S102).

When the selection is accepted by the touch panel 12, the controller 21 arranges, in accordance with the separation distances, the positions of the image forming apparatuses 30, the position P of the mobile terminal device 10, and the direction D; then, the controller 21 causes the display unit 11 to display the aforesaid in the manner exemplified in FIG. 3 (S103).

When, during the aforesaid display, the user is moving by walk while carrying the mobile terminal device 10, the controller 21 timely updates the positions of the image forming apparatuses 30, the position P of the mobile terminal device 10, and the direction D all of which are being displayed on the display screen of the display unit 11, and causes the display unit 11 to display the updated. Therefore, the user can know the positions of the image forming apparatuses 30, the position P of the mobile terminal device 10, and the direction D at any time during the moving.

Subsequently, the controller 21 causes the network communication unit 13 to transmit respective waiting time notification requests to each of the image forming apparatuses 30 (S104).

In each of the image forming apparatuses 30, the network communication section 33 receives the waiting time notification request. In response to the waiting time notification request, the controller 41 calculates the job being processed and being standby at this time point and processing times necessary to process the mentioned jobs. The controller 41 then calculates, by using the calculated time, the waiting time till an estimated time begins at which the next job to be accepted can be started. For example, by the product of the printing time of one recording sheet and the number of recording sheets to be printed, the controller 41 calculates the time required to process one job. The controller 21 transmits the information indicating the calculated waiting time and the identification signal indicating the image forming apparatus 30 of itself to the mobile terminal device 10 from the network communication unit 33.

In the mobile terminal device 10, the network communication unit 13 receives from each of the image forming apparatuses 30 the information indicating the waiting time and the identification signal (S105). Upon receiving for each of the image forming apparatuses 30 the information indicating the waiting time, and the identification signal, the controller 21 displays, near the images Q1, S2, and Q3, the respective waiting times indicated by the information (S106), the images Q1, Q2, and Q3 indicating the image forming apparatuses 30 on the display unit 11, respectively. For example, as shown in FIG. 3, the controller 21 causes the display unit 11 to display, on the display screen thereof, the respective waiting times T1, T2, and T3 in the vicinity of the images Q1, Q2, and Q3 of the image forming apparatuses 30.

As a result, the user of the mobile terminal device 10 can know the positions of the image forming apparatuses 30 relative to the mobile terminal device 10 and the direction D of the mobile terminal device 10 by seeing the display screen of the display unit 11, and also can know the waiting times until execution of job processing in each image forming apparatus 30 in the case where a print job is requested to the image forming apparatuses 30. Thus, the user can select, from among the image forming apparatuses 30, one image forming apparatus 30 under which the job processing can be started the earliest when the print job is requested.

Subsequently, the controller 21 determines an operating state to be set at each of the image forming apparatuses 30 in accordance with the separation distance between the mobile terminal device 10 and each of the image forming apparatuses 30 at this time point (S107). The controller 21 transmits the information indicating the determined operating state from the network communication unit 13 to the respective image forming apparatuses 30 (S108).

Examples of the operating state of the image forming apparatuses 30 are: a standby state requiring a certain period of time to start the operation of the image forming apparatus 30; a preparatory state being capable of start the operation of the image forming apparatus 30 in a shorter time than the certain period of time; and a printable state in which the operation of the image forming apparatus 30 can be immediately started. Difference among the standby state, the preparatory state, and the printable state is mainly based on the difference in the temperature of heating rollers of fixing devices in the image forming apparatuses 30: the lower the temperature of the heating roller, the longer it takes longer time to start the operation of the image forming apparatus 30.

The controller 21 stores in advance the standby state, the preparatory state, and the printable state in association with the separation distance of the image forming apparatus 30 from the mobile terminal device 10 (the distance being obtained in S101).

For example, if the separation distance of the image forming apparatus 30 is a long distance, the controller 21 determines the standby state as the operating state corresponding to the long distance, and transmits, to the image forming apparatus 30, the signal of the image forming apparatus 30 and the information indicating the standby state. If the separation distance of the image forming apparatus 30 is an intermediate distance, the controller 21 determines the preparatory state as the operating state corresponding to the intermediate distance, and transmits, to the image forming apparatus 30, the signal of the image forming apparatus 30 and the information indicating the preparatory state. Similarly, if the separation distance of the image forming apparatus 30 is a short distance, the controller 21 determines the printable state as the operating state corresponding to the short distance, and transmits, to the image forming apparatus 30, the signal of the image forming apparatus 30 and the information indicating the printable state. The controller 21 causes the display unit 11 to display images each representing the operating state of each respective image forming apparatuses 30.

The network communication unit 33 receives the identification signal and the information indicating the operating state in each of the image forming apparatuses 30. Upon confirming that the received identification signal is from the image forming apparatus 30 of its own, the controller 41 sets the operating state of its own image forming apparatus 30 to the operating state indicated by the received information.

Therefore, the operating state of the image forming apparatus 30 whose separation distance from the mobile terminal device 10 is a long distance is set to the standby state; the operating state of the image forming apparatus 30 whose separation distance therefrom is an intermediate distance is set to the preparatory state; the operating state of the image forming apparatus 30 whose separation distance therefrom is a short distance is set to the printable state. However, when the image forming apparatus 30 is already in the operating state of printing, the controller 41 of the image forming apparatus 30 continues the operating state of printing regardless of the information indicating the operating state transmitted from the mobile terminal device 10, that is, regardless of the separation distance of the image forming apparatus 30 from the mobile terminal device 10.

Thereafter, in the mobile terminal device 10, the controller 21 determines which of the print execution instruction (instruction to execute printing) and the print cancel instruction has been accepted from the user (S109, S110).

The controller 21 is causing the display unit 11 to display, on the display screen thereof, the print key PK and the cancel key CK (see FIG. 3). When the user presses the cancel key CK and the touch panel 12 accepts the press on the cancel key CK, the controller 21 terminates the processing in accordance with the instruction from the touch panel 12 (YES in S109).

On the other hand, without operating the cancel key CK in the manner described above (NO in S109), when the user selects, among the images representing the image forming apparatuses 30 on the display screen of the display unit 11, the image of the image forming apparatus 30 that the user desires to execute the printing at and presses the image, and when the user further presses the print key PK and the touch panel 12 accepts the presses, designation of the image forming apparatus 30 and the print execution instruction are transmitted from the touch panel 12 to the control section 21. Then, the controller 21 accepts the designation and the print execution instruction (YES in S110).

Upon accepting the designation and the print execution instruction (YES in S110), the controller 21 transmits the image data selected in S102 and the print execution request to the designated image forming apparatus 30 from the network communication unit 13 (S111). While the controller 21 is not accepting the designation and print execution instruction (NO in S110), the process returns to S109.

In the image forming apparatus 30 that has received the image data and the print execution request at the network communication section 33, the control section 41 causes the image forming unit 37 to form (print) the image on the recording sheet in response to the print execution request by using the received image data. Here, in the image forming apparatus 30, the time until the image formation is started differs depending on whether the operating state is the standby state, the preparatory state, or the printable state.

Figure 4B:
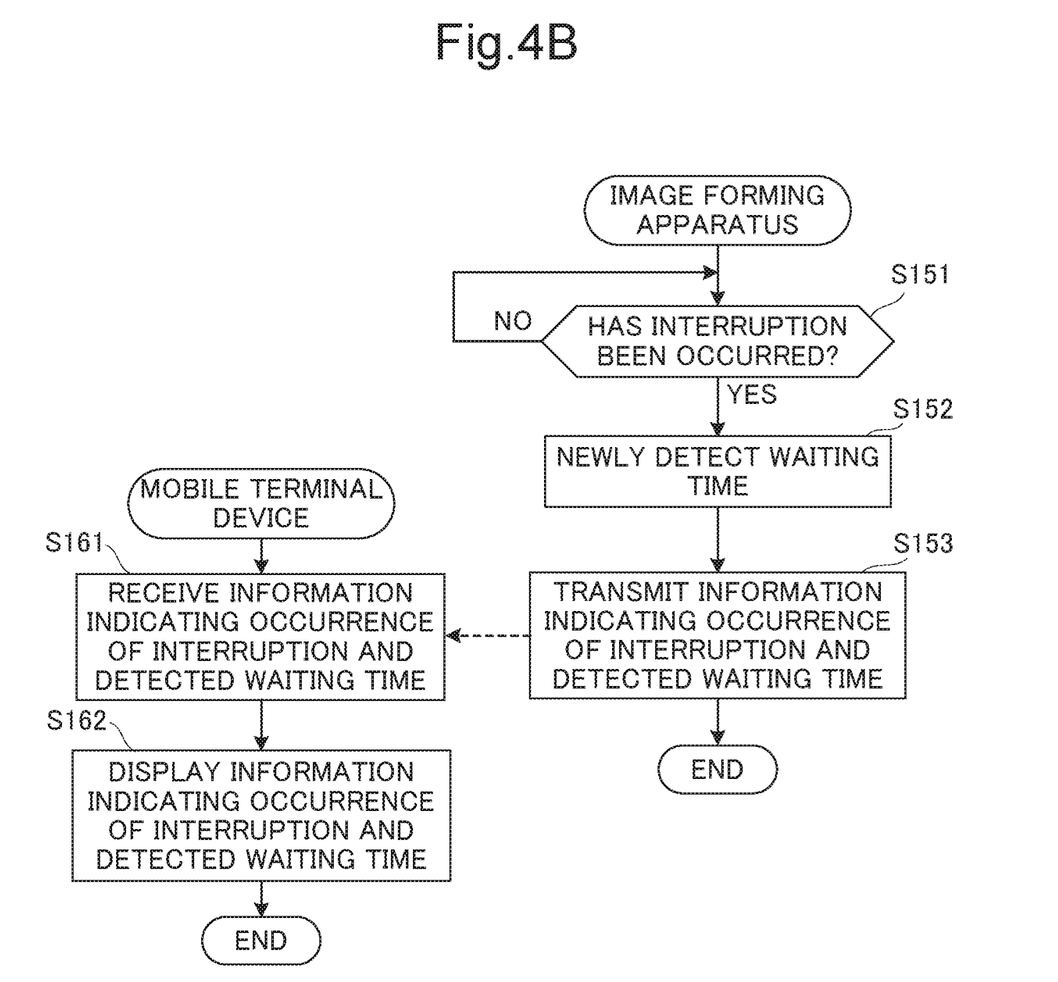
FIG. 4B is a flowchart showing processing procedures such as displaying of the position and a direction of the position and the direction of each of the image forming apparatuses relative to the mobile terminal device, selecting of an arbitrary image forming apparatus, and transmission of image data to the selected image forming apparatus.

Further, as shown in FIG. 4B, in the image forming apparatus 30, when, in response to the print execution request, interruption of another job to be processed occurs before executing the print job or while executing the print job (YES in S151), the controller 41 newly detects the waiting time after the occurrence of the interruption (S152) and causes the network communication unit 33 to transmit information indicating the occurrence of the interruption and the newly detected waiting time to the mobile terminal device 10 via the network N (S153).

In the mobile terminal device 10, when the network communication unit 13 receives the information indicating the occurrence of the interruption and the detected waiting time from the image forming apparatus 30 (S161), the controller 41 causes the display unit 11 to display an image representing that the interruption has been occurred on the image forming apparatus 30 and an image representing the detected waiting time (S162).

As a result, even when the interruption of another job occurs before or during executing the print job in response to the print execution request after requesting the print execution to the image forming apparatus 30, the user is capable of grasp the delay of execution of the printing due to the occurrence of the interruption and the new waiting time due to the occurrence of the interruption by viewing the content displayed on the display unit 11 of the mobile terminal device 10.

As described above, in the present embodiment, the positions of the image forming apparatuses 30, the position P of the mobile terminal device 10 relative to each of the image forming apparatuses 30, the direction D, and the waiting times are displayed on the display unit 11 of the mobile terminal device 10, so that the user of the mobile terminal device 10 operates the touch panel 12 to easily determine which of the image forming apparatuses 30 is suitable for image formation, for example, by determining the image forming apparatus 30 being installed in the nearest place to oneself from the image forming apparatuses 30. Then, the user can select the image forming apparatus 30 suitable for image formation, and transmits the image data to the selected image forming apparatus 30, to thereby print the image data at the image forming apparatus 30.

In the first image processing system described in the above BACKGROUND, the user of the mobile terminal cannot select an arbitrary printer among a plurality of printers, so that it cannot be said that user friendliness is good. Furthermore, in the second image processing system described in the above BACKGROUND, even if the user of the mobile terminal selects an arbitrary printer among a plurality of printers, the display of the mobile terminal only displays the distance between the mobile terminal and each of the printers. Thus, the user cannot accurately grasp the positions of the printers relative to the mobile terminal and cannot make precise selection of printers.

In contrast, the present embodiment displays the position and direction of the mobile terminal device 10 relative to the plurality of image forming apparatuses 30, allowing the user to determine the image forming apparatus 30 suitable for image formation.

In addition, the controller 21 causes the display unit 11 to display the respective waiting times of each image forming apparatus 30 on the display screen thereof in the above embodiment, but instead of the waiting time, messages as follows may be displayed: for a state with no waiting time, "no jobs"; for a state with waiting time, "printing"; and for a state with long waiting time, "busy".

Further, the configurations and processing of the above embodiment described with reference to FIG. 1 to FIG. 4B are merely illustrative of the present disclosure and the present disclosure is not intended to be limited to the above configurations and processing.

Figure 5:
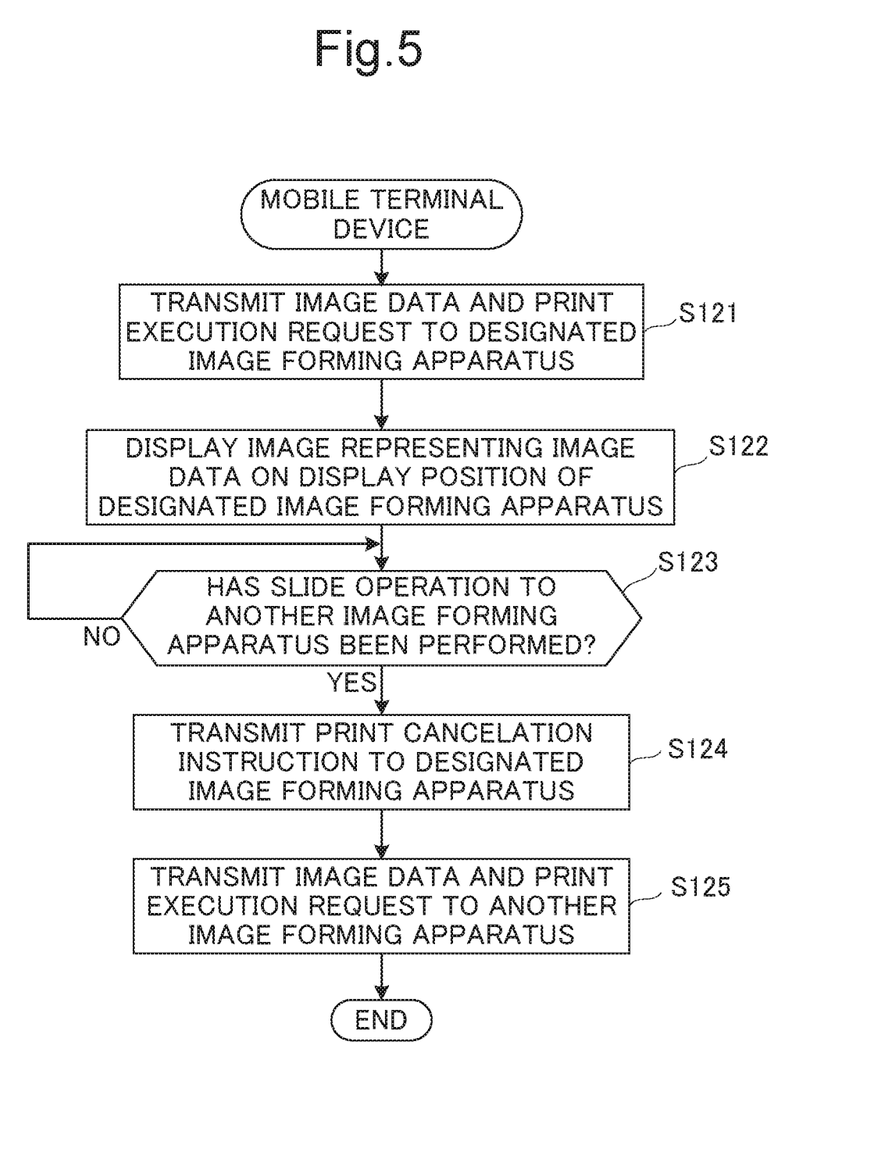
FIG. 5 is a flowchart showing processing performed by the mobile terminal device and a designated image forming apparatus.
Figure 6:
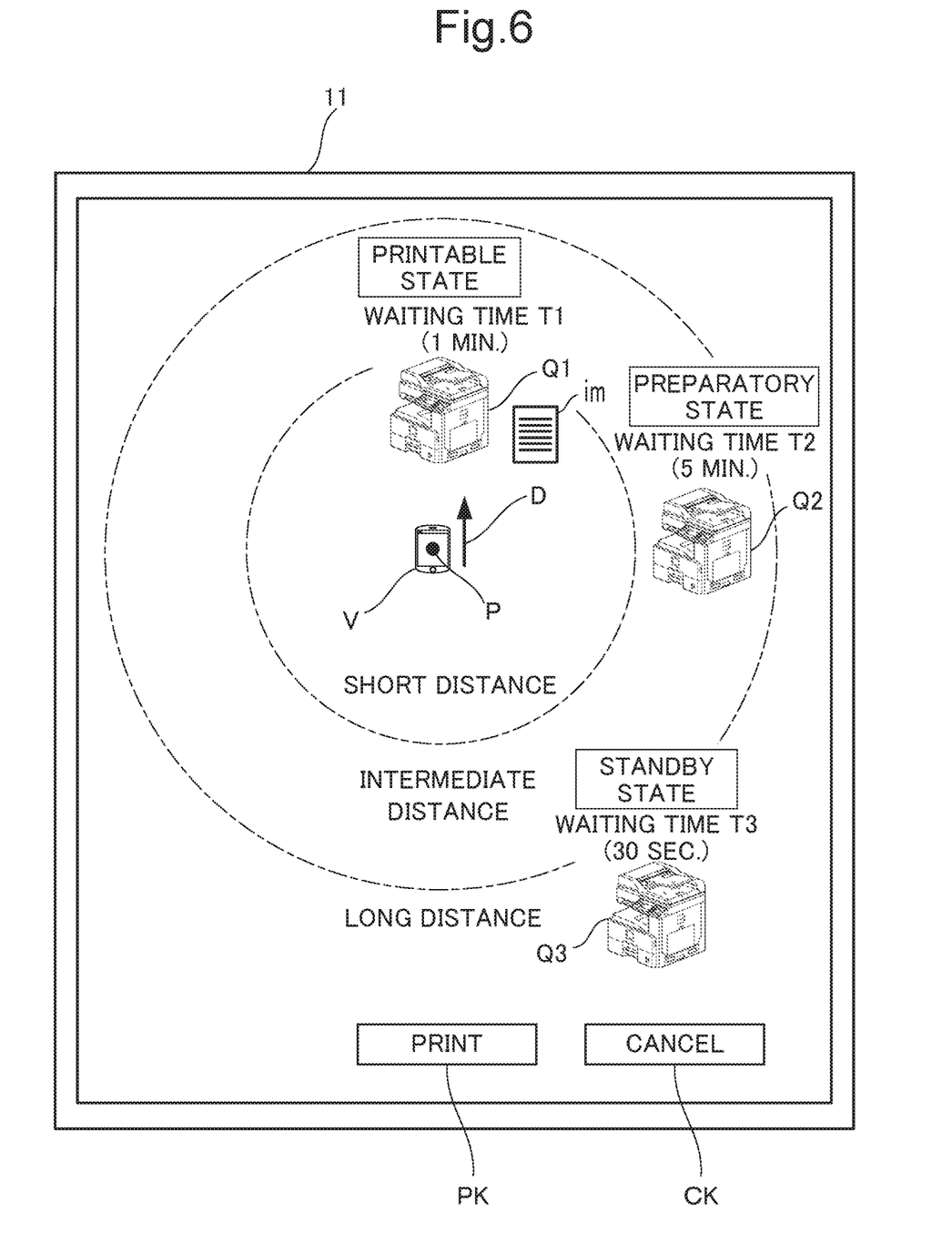
FIG. 6 is a diagram showing an example of a display screen of the display unit.
Figure 7:
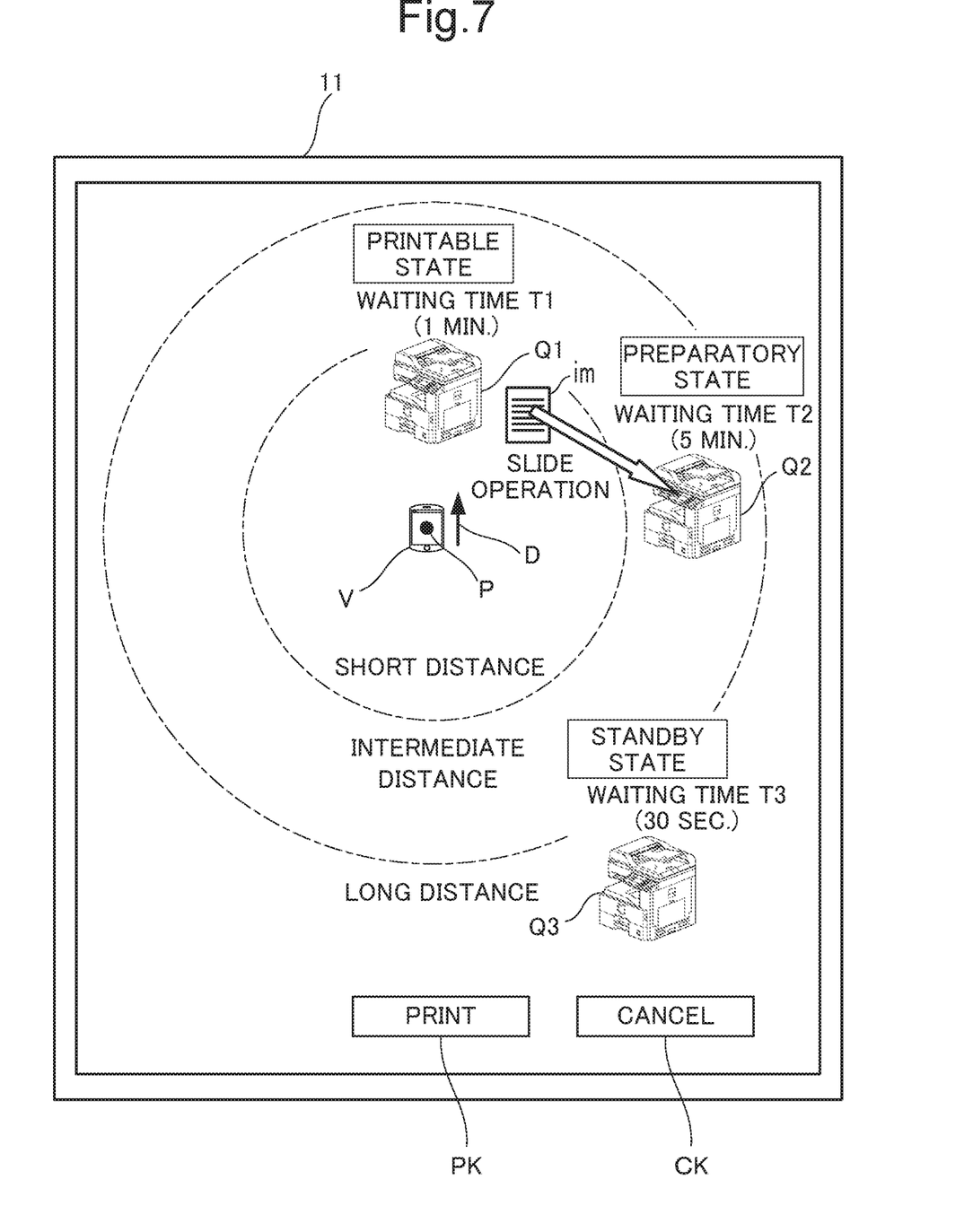
FIG. 7 is a diagram showing another example of the display screen of the display unit.

For example, after the image data to be printed is transmitted from the mobile terminal device 10 to the designated image forming apparatus 30, the processing to be described as follows may be performed in the mobile terminal device 10 and the designated image forming apparatus 30. FIG. 5 is a flowchart showing processing performed by the mobile terminal device 10 and the designated image forming apparatus 30. FIG. 6 and FIG. 7 are diagrams showing examples of the display screen of the display unit 11.

After causing the network communication unit 13 to transmit, to the designated image forming apparatus 30, the image data to be printed and the print execution request (S121), the controller 21 of the mobile terminal device 10 causes the display unit 11 to display, on the display screen thereof, an image im representing the image data at the display position of the image representing the designated image forming apparatus 30 (S122), as shown in the example in FIG. 6.

When, in the state where such the display screen is being displayed on the display unit 11, the user performs a slide operation on the display screen starting from the position of the image im representing the image data to be printed to a position of an image representing another image forming apparatus 30 different from the image representing the designated image forming apparatus 30 (see FIG. 7), and the touch panel 12 accepts the slide operation (YES at S123), the controller 21 causes the network communication section 13 to transmit the print cancellation instruction to the designated image forming apparatus 30 (S124), and at the same time, causes the network communication section 13 to transmit the image data to be printed and the print execution request of the image data to another image forming apparatus 30 (S125).

As a result, without performing the operation of cancelling the print execution request having been performed on the designated image forming apparatus 30, the user can allow another image forming apparatus 30 to perform the printing only by performing the slide operation (being the print execution request operation toward another image forming apparatus 30 different from the designated image forming apparatus 30), where the printing at the designated image forming apparatus 30 is not performed.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image processing system comprising a plurality of image forming apparatuses and a mobile terminal device connected to each of the image forming apparatuses via a network, each of the image forming apparatuses including:
 a first network communication unit that performs data communication with the mobile terminal device via the network,
 a first near field communication unit that performs near field communication with the mobile terminal device;
 an image forming unit that forms an image on a recording sheet; and
 a first controller that causes the image forming unit to form, on the recording sheet, an image shown by image data transmitted from the mobile terminal device and been received by the first network communication unit, and the mobile terminal device including:
 a display unit;
 an operation unit that accepts input of an instruction from a user;
 a second network communication unit that performs data communication with each of the image forming apparatuses via the network;
 a second near field communication unit that performs near field communication with the first near field communication unit of each of the image forming apparatuses; and
 a second controller that: when the second near field communication unit receives respective wireless signals transmitted from each of the image forming apparatuses, detects a position and a direction of each of the image forming apparatuses relative to the mobile terminal device on a basis of each of the wireless signals and causes the display unit to display the positions and the directions; and when the operation unit accepts an instruction to select a first one of the image forming apparatuses, causes the second network communication unit to transmit image data to be printed and a print execution request to the first one of the image forming apparatuses selected by the instruction, wherein in the mobile terminal device, after the instruction to select the first one of the image forming apparatuses has been accepted by the operation unit and the second controller has caused the second network communication unit to transmit the image data to the first one of the image forming apparatuses selected by the instruction, when the operation unit accepts an instruction to select a second one of the image forming apparatuses, the second controller causes the second network communication unit to transmit a print cancellation instruction to the selected first one of the image forming apparatuses and causes the second network communication unit to transmit the image data to the selected second one of the image forming apparatuses, and in the mobile terminal device, the display unit includes a touch panel, and the second controller:
 causes, when the second network communication unit transmits the image data to the first one of the image forming apparatuses selected by the instruction and the image forming apparatus being as a transmission destination accepts the image data, the display unit to display an image representing the image data at a position where an image representing the selected first one of the image forming apparatuses;

causes, when the touch panel accepts a slide operation between the position of the image representing the image data and a position of an image representing the second one of the image forming apparatuses, the second network communication unit to transmit the print cancellation instruction to the selected first one of the image forming apparatuses; and causes the second network communication unit to transmit the image data to the selected second one of the image forming apparatuses.

2. The image processing system according to claim 1, wherein in each of the image forming apparatuses, on the basis of a queue of jobs that each individual image forming apparatus is to execute, the first controller detects a waiting time required before the jobs in the queue are completed, and causes the first network communication unit to transmit the waiting time to the mobile terminal device, and in the mobile terminal device, when the second network communication unit receives the waiting time for each of the image forming apparatuses, the second controller causes the display unit to display the waiting time of each of the image forming apparatuses.

3. The image processing system according to claim 1, wherein in the mobile terminal device, the second controller individually determines an operating state of each of the image forming apparatuses in accordance with separation distance between the mobile terminal device and each individual image forming apparatus, and causes the second network communication unit to transmit, to each of the image forming apparatuses, the information indicating the determined operating state that corresponds to the image forming apparatus to which the information is to be transmitted, and in each of the image forming apparatuses, when the first network communication unit receives the information indicating the operating state, the first controller sets the image forming apparatus into the operating state.

4. The image processing system according to claim 3, wherein when the image forming apparatus is already in the operating state of printing, the first controller of each of the image forming apparatuses continues the operating state of printing regardless of the information indicating the operating state transmitted from the mobile terminal device.

5. The image processing system according to claim 1, wherein when the operation unit accepts the instruction to select image data to be printed displayed on the display unit, the second controller detects the position and the direction of each of the image forming apparatuses relative to the mobile terminal device on the basis of the respective wireless signals having been transmitted from each of the image forming apparatuses and been received by the second near field communication unit and causes the display unit to display the positions and the directions.

6. The image processing system according to claim 1, wherein in the mobile terminal device, the second controller detects, on a predetermined cycle, the position and the direction of each of the image forming apparatuses relative to the mobile terminal device on the basis of the respective wireless signals having been transmitted from each of the image forming apparatuses and been received by the second near field communication unit and causes the display unit to sequentially display the positions and the directions.

7. An image processing system comprising a plurality of image forming apparatuses and a mobile terminal device connected to each of the image forming apparatuses via a network, each of the image forming apparatuses including:
a first network communication unit that performs data communication with the mobile terminal device via the network,
a first near field communication unit that performs near field communication with the mobile terminal device;
an image forming unit that forms an image on a recording sheet and a first controller that causes the image forming unit to form, on the recording sheet, an image shown by image data transmitted from the mobile terminal device and been received by the first network communication unit, and the mobile terminal device including:
a display unit;
an operation unit that accepts input of an instruction from a user;
a second network communication unit that performs data communication with each of the image forming apparatuses via the network;
a second near field communication unit that performs near field communication with the first near field communication unit of each of the image forming apparatuses; and
a second controller that: when the second near field communication unit receives respective wireless signals transmitted from each of the image forming apparatuses, detects a position and a direction of each of the image forming apparatuses relative to the mobile terminal device on a basis of each of the wireless signals and causes the display unit to display the positions and the directions; and when the operation unit accepts an instruction to select a first one of the image forming apparatuses, causes the second network communication unit to transmit image data to be printed and a print execution request to the first one of the image forming apparatuses selected by the instruction, wherein in the first one of the image forming apparatuses selected by the instruction, after the image data transmitted from the mobile terminal device has been received by the first network communication unit, when interruption of another job to be processed occurs before or during execution of job based on the image data, the first controller newly detects the waiting time after the occurrence of the interruption, and causes the first network communication unit to transmit information indicating the occurrence of the interruption and the detected waiting time via the network to the mobile terminal device, and when in the mobile terminal device, when the second network communication unit receives the information indicating the occurrence of the interruption and the detected waiting time, the second controller causes the display unit to display an image representing that the interruption has been occurred in the first one of the image forming apparatuses and an image representing the newly detected waiting time.

* * * * *